(12) United States Patent
O'Connell et al.

(10) Patent No.: US 11,380,067 B2
(45) Date of Patent: Jul. 5, 2022

(54) SYSTEM AND METHOD FOR PRESENTING VIRTUAL CONTENT IN AN INTERACTIVE SPACE

(71) Applicant: Meta View, Inc., San Mateo, CA (US)

(72) Inventors: Kharis O'Connell, San Mateo, CA (US); Yazan Kawar, San Mateo, CA (US); Michael Stein, San Mateo, CA (US); Nicholas Cottrell, San Mateo, CA (US); Amber Choo, San Mateo, CA (US); Cory Evens, San Mateo, CA (US); Antonio M. Vasquez, San Mateo, CA (US)

(73) Assignee: Campfire 3D, Inc., San Mateo, CA (US)

(*) Notice: Subject to any disclaimer, the term of this patent is extended or adjusted under 35 U.S.C. 154(b) by 0 days.

(21) Appl. No.: 17/051,562

(22) PCT Filed: Apr. 30, 2019

(86) PCT No.: PCT/US2019/029960
§ 371 (c)(1),
(2) Date: Oct. 29, 2020

(87) PCT Pub. No.: WO2019/213111
PCT Pub. Date: Nov. 7, 2019

(65) Prior Publication Data
US 2021/0225084 A1 Jul. 22, 2021

Related U.S. Application Data

(60) Provisional application No. 62/664,826, filed on Apr. 30, 2018.

(51) Int. Cl.
G06T 19/00 (2011.01)
G06F 3/01 (2006.01)
G06T 19/20 (2011.01)
G02B 27/01 (2006.01)
G06F 3/04815 (2022.01)

(52) U.S. Cl.
CPC ........ G06T 19/006 (2013.01); G02B 27/0172 (2013.01); G06F 3/011 (2013.01); G06F 3/017 (2013.01); G06F 3/04815 (2013.01); G06T 19/20 (2013.01); G02B 2027/014 (2013.01); G02B 2027/0141 (2013.01); G06T 2219/2012 (2013.01)

(58) Field of Classification Search
CPC ...................................................... G06T 19/20
USPC ........................................................ 345/419
See application file for complete search history.

(56) References Cited

U.S. PATENT DOCUMENTS 9,928,661 B1* 3/2018 Kinstner ................. A63F 13/20
2010/0156892 A1* 6/2010 Chan, II .................. G06T 11/60
345/419

(Continued)

OTHER PUBLICATIONS

The International Search Report and Written Opinion, dated Jul. 18, 2019, in the corresponding PCT Appl. No. PCT/US2019/029960.

(Continued)

Primary Examiner — Javid A Amini

(57) ABSTRACT

A system configured to present virtual content in an interactive space may comprise one or more of a light source, an optical element, one or more physical processors, non-transitory electronic storage, and/or other components.

11 Claims, 8 Drawing Sheets

(56) References Cited

U.S. PATENT DOCUMENTS

2012/0249741 A1* 10/2012 Maciocci .............. G06T 15/503
                                                          348/46
2017/0287225 A1* 10/2017 Powderly .............. G06F 3/0346
2017/0336941 A1* 11/2017 Gribetz .................. G06T 19/20
2018/0005433 A1*  1/2018 Kohler .................... G06T 17/00
2019/0197785 A1*  6/2019 Tate-Gans ............. G06T 19/006
2020/0368616 A1* 11/2020 Delamont ............... A63F 13/25

OTHER PUBLICATIONS

HOF. "Sharing a Virtual Object and Placing it. ARTris—Part #1." Jan. 29, 2018 (jan. 29, 2018) Retrieved on Jun. 24, 2019 (Jun. 24, 2019) from https://medium.com/artris/artris-part-1-sharing-a-virtual-object-and-placing-it-e91290263f3f, entire document.

* cited by examiner

SYSTEM AND METHOD FOR PRESENTING VIRTUAL CONTENT IN AN INTERACTIVE SPACE

CROSS-REFERENCE TO RELATED APPLICATIONS

This application is a National Stage Application of PCT/US2019/029960 filed on Apr. 30, 2019, which claims priority from U.S. Provisional Patent Application No. 62/664,826 filed on Apr. 30, 2018. Each of prior mentioned applications is hereby expressly incorporated by reference herein in its entirety.

FIELD OF THE INVENTION

The system and methods described herein relate to presenting virtual content in an interactive space.

BACKGROUND OF THE INVENTION

Interactive spaces, such as augmented reality environments, may be used to present virtual content to users.

SUMMARY

The systems and methods described herein facilitate presenting virtual content (e.g., virtual objects in the form of three dimensional digital imagery) in an interactive space. The interactive space may include one or more of a virtual reality environment, an augmented reality environment, and/or other interactive spaces. An "augmented reality environment," as used herein, may refer to a space that represents a virtual environment that may be superimposed over a view of a real-world environment around a user. An augmented reality environment may include attributes of a virtual environment, including virtual objects superimposed over views of the physical environment. A virtual reality environment may refer to a space that includes the virtual environment. The terms "space" and "environment" in the context of an interactive space may be used interchangeably herein.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
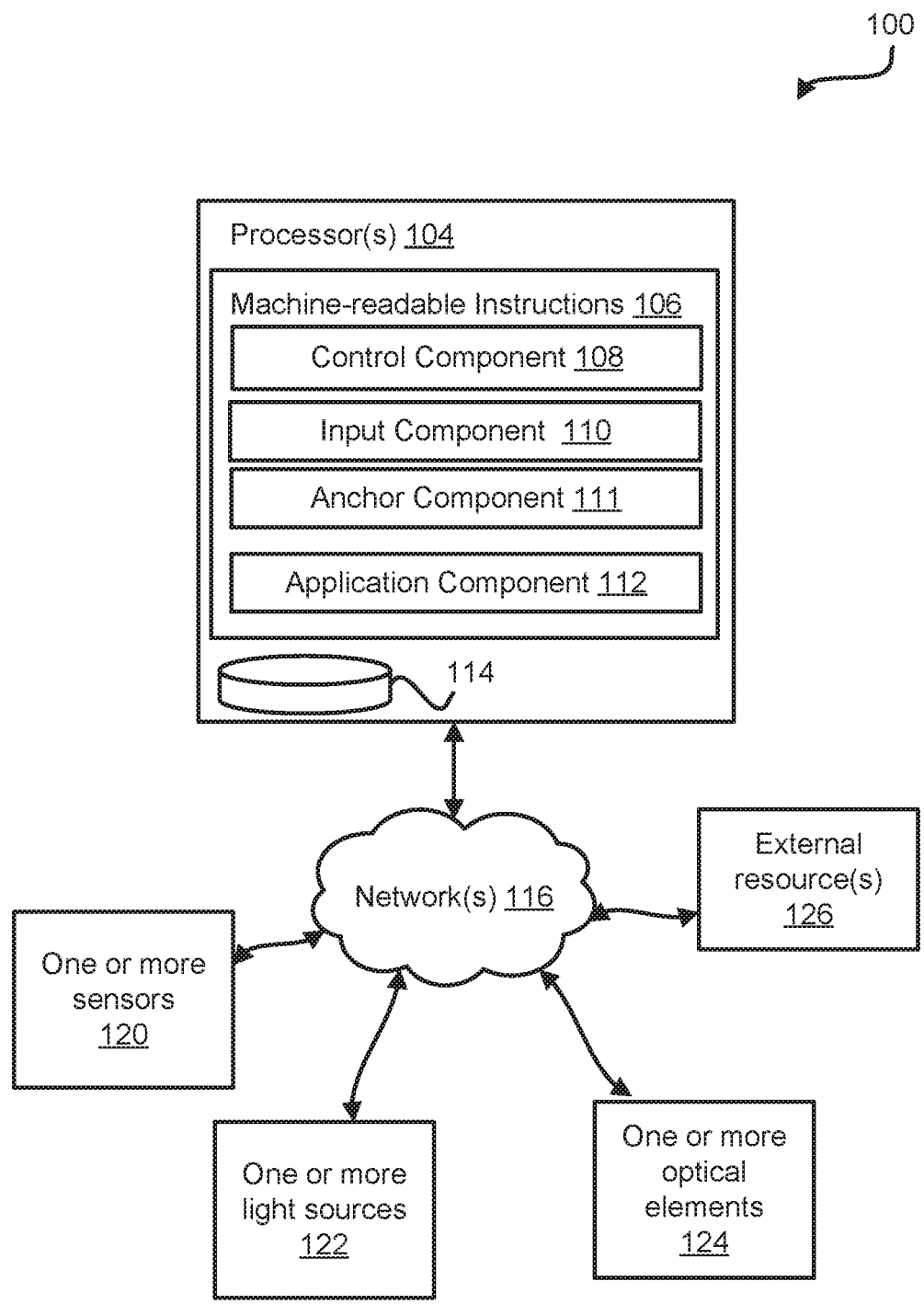
FIG. 1 illustrates a system configured to present virtual content in an interactive space, in accordance with one or more implementations.

FIG. 1 shows a system 100 configured to present virtual content in an interactive space. A virtual presentation area may be provided for presenting virtual objects and/or editing virtual objects.

The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through systems, as described herein, employing hardware and/or software architectures to form virtual content (e.g., digital images) that may be perceived to be located in real-world space by virtue of the principles of the depth sensitive modules of the human brain.

The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. In some implementations, an augmented reality environment may represent physical objects in the physical world as virtual objects in the augmented reality environment. A virtual reality environment may refer to a space that includes the virtual environment. The terms "space" and "environment" may be used interchangeably herein.

The system 100 may include one or more of one or more physical processors 104, one or more sensors 120, one or more light sources 122, one or more optical elements 124, and/or other components. In some implementations, one or more components of system 100 may be incorporated in a headset such as a head-mounted display (HMD), and/or other devices. By way of non-limiting illustration, one or more optical elements 124 may comprise at least part of a visor of an HMD.

In some implementations, individual light sources of one or more light sources 122 may be configured to emit light forming images of virtual content. An individual light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be received by one or more optical elements 124. In some implementations, a set of components comprising at least one optical element and at least one light source may be referred to as an "image-forming component." In some implementations, control of position and/or light generation of individual light sources 122 may impact one or more aspects of a perceived three-dimensional light field and/or virtual content within the three-dimensional light field. One or more aspects of virtual content within a three-dimensional light field may include one or more of a perceived range of the virtual content from a user, a perceived depth of the virtual content, a perceived size of the virtual content, and/or other aspects of the virtual content.

In some implementations, one or more optical elements 124 may form at least part of a portion of a headset (not shown in FIG. 1) through which a user may view the real world. Individual optical elements of one or more optical elements 124 may be configured to provide the light emitted from the light source to an eye of the user to generate a perceived three-dimensional light field within the user's field-of-view. In some implementations, a headset (such as an HMD) may be configured to present images individually to each eye of the user as stereo image pairs. In this configuration, the headset may include a first set of components for one eye and a second set of components for another eye. The first set of components may include one or more lights sources, one or more optical elements, and/or other components. The second set of components may include one or more lights sources, one or more optical elements, and/or other components.

In some implementations, individual optical elements of one or more optical elements 124 may comprise one or more reflective and/or partially reflective surfaces. An optical element may be formed from a reflective and/or partially reflective material. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials.

In some implementations, individual optical elements of one or more optical elements 124 may be arranged on a headset (not shown in FIG. 1) such that, when the headset is installed on the head of a user, the user's gaze may be directed toward one or more optical elements 124. In some implementations, one or more optical elements 124 may be arranged on a headset such that, when the headset is installed on the head of the user, light rays generated by one or more light sources 122 may be directed onto one or more optical elements 124 to form images of virtual content on one or more optical elements 124. The images of virtual content formed on one or more optical elements 124 may be superimposed over the user's view of the real world through one or more optical elements 124 to create an interactive space. It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements 124 may be arranged on a headset such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

Figure 10:
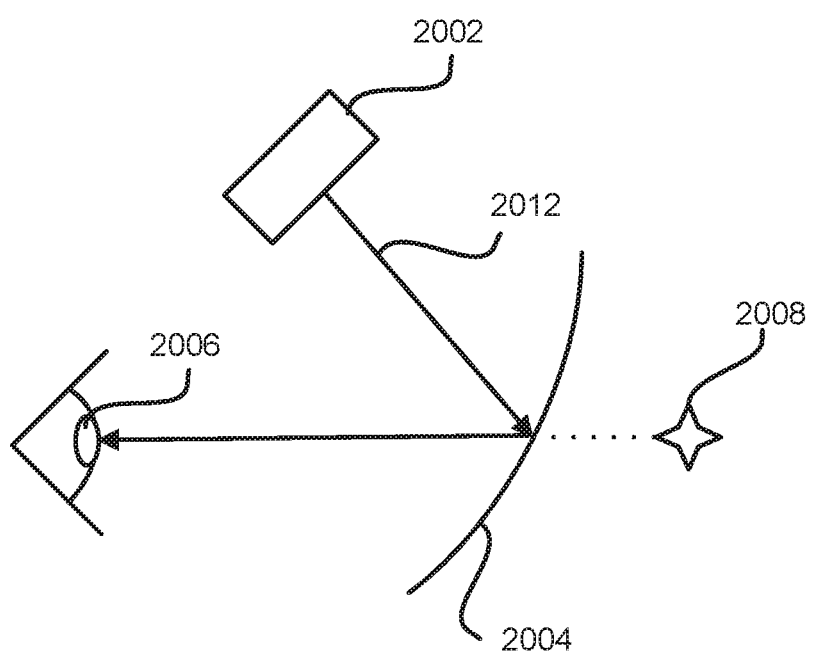
FIG. 10 illustrates an exemplary configuration of a light source and an optical element configured to generate an interactive space.

By way of non-limiting illustration, FIG. 10 shows an exemplary configuration of a light source 2002 and an optical element 2004 for generating an interactive space. In some implementations, one or more of light source 2002, optical element 2004, and/or other components may be incorporated into a head-mounted display, and/or other devices. FIG. 10 shows a light beam 2012 emitted from light source 2002. The light beam 2012 may be directed at optical element 2004. The light beam 2012 may be provided into a user's eye 2006 via optical element 2004. The light beam 2012 may be part of light generated by light source 2002 to depict a digital image that may correspond to virtual content 2008 to be perceived by the user in three-dimensional real-world space.

Figure 11:
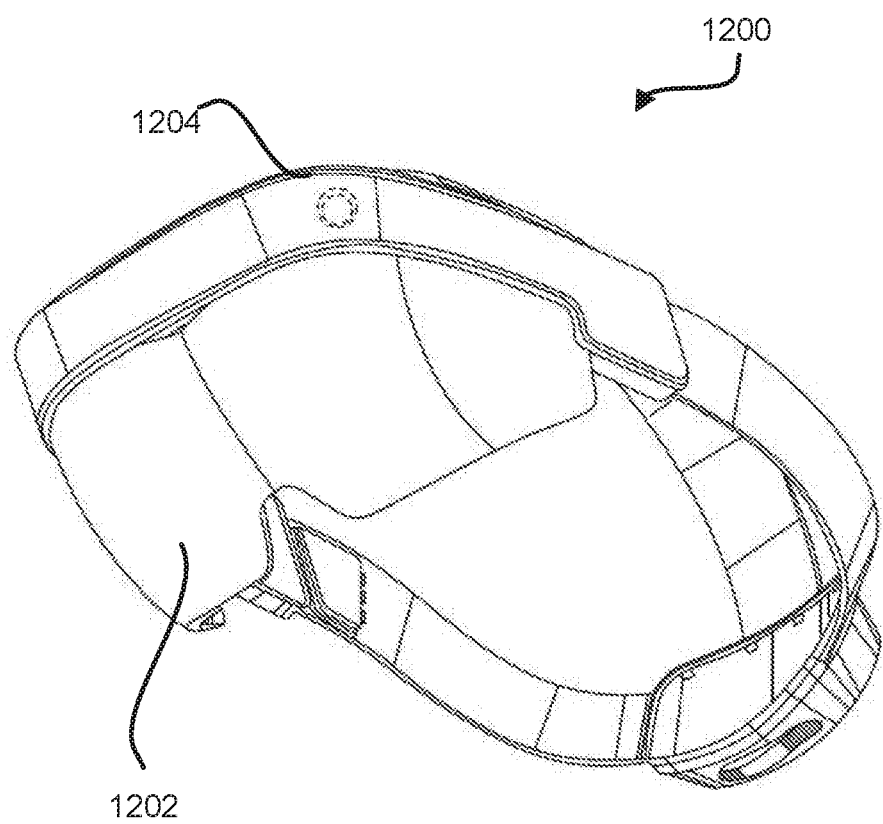
FIG. 11 illustrates a headset.

Referring now to FIG. 11, in some implementations, a headset may comprise an HMD 1200. One or more components of system 100 (FIG. 1) may be held by and/or comprise part of HMD 1200. By way of non-limiting illustration, one or more optical elements of individual image-forming components may comprise at least part of a visor portion 1202 of an HMD 1200. One or more of one or more physical computer processors, one or more light sources, and/or other components may be incorporated into a housing portion 1204 and/or other portions of HMD 1200.

Returning to FIG. 1, individual sensors of one or more sensors 120 may be configured to generate output signals conveying position information, and/or other information. Position information may include one or more of positions of one or more surfaces of one or more real-world objects within a real-world environment, ranges of one or more surfaces of one or more real-world objects from a sensor, and/or other information. In some implementations, a position of a surface may be expressed as one or more of distance from an individual sensor, an angle from reference line (e.g., a horizontal line), and/or other information. By way of non-limiting illustration, a position may be represented as a vector having vector components.

In some implementations, one or more sensors 120 may include one or more of a camera, a three-dimensional scanner, a depth sensor or depth camera, a rangefinder, a laser gauge, a time-of-flight sensor, an IR camera/emitter pair, a passive, structured, or unstructured light stereo pair, and/or other devices. A depth sensor or depth camera may include a three-dimensional volumetric imaging sensor, and/or other devices. In some implementations, sensor output of an individual sensor may comprise point cloud information and/or other information. Point cloud information may include a set of points that may lie on surfaces of real-world objects within a range of the sensor, and/or other sensor output. Point cloud information may specify individual ranges of individual points within three-dimensional space representing three-dimensional ranges of surfaces the individual points may lie on. The position information may include the point cloud information and/or may derived from the point cloud information.

In some implementations, a sensor may comprise a camera. An individual camera may be configured to generate image information defining images of a real-world environment within a field-of-view of the camera. Position information may be determined from the image and/or other information using one or more image-based approaches. The one or more image-based approaches may include one or more of computer vision, object recognition, SIFT, SURF, position triangulation, and/or other techniques. While a point within a point cloud may represent a surface of a fingertip and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing a range of the surface of the fingertip.

In some implementations, one or more physical processors 104 may include and/or may be coupled to non-transitory electronic storage media 114 and/or other components. The non-transitory electronic storage media 114 may be configured to store virtual content information, and/or other information. Virtual content information may define virtual content. Virtual content may have features including one or more of form, size, shape, color, functionality, animations, and/or other defining aspects. In some implementations, virtual content may include virtual objects.

Individual virtual objects may be defined by one or more of visual information, effects information, metadata information, and/or other information. The visual information may specify visual characteristics of individual virtual objects. The effects information may specify effects applied to the individual virtual objects and/or effects available to be applied to the individual virtual objects. The metadata information may include one or more of identification information, relationship information, the effects information, and/or other information. Identification information may include information identifying one or more of the individual virtual object (e.g., a title, a serial number, and/or other information), a creator of the virtual object (e.g., a name, a username, and/or other information), a creation date, an edit date (e.g., date when most recently edited), an edit list (e.g., time and date of one or more edits previously applied), and/or other information. An edit may refer to a change made to information defining a virtual object. Relationship information may include information identifying related virtual objects. In some implementations, related virtual objects may include a group of objects that may be part of the same or similar project, theme, creator, and/or other aspect of relatedness. In some implementations, related virtual objects may include a group of object that are part of the omnibus object. By way of non-limiting illustration, individual objects within a group of objects may include individual parts or portions of the omnibus object. The individual objects may be assembled to the form the omnibus object. The individual objects may be accessed, via the virtual presentation area, separately and independently from the assembled form as the omnibus object.

In some implementations, one or more aspects of virtual content (e.g., visual characteristics, applied effects, and/or other aspects) may be defined by values of one or more parameters of the virtual content. The parameters may include one or more of one or more size parameters, one or more color parameters, one or more highlight parameters, one or more display mode parameters, one or more animation parameters, and/or other parameters.

Values of one or more size parameters for a virtual object may specify a perceived size of the virtual object. In some implementations, a size of the virtual object may be specified by a single value for the size parameter and/or a set of values for a set of size parameters. Values of a size parameter may be qualitative and/or quantitative. By way of non-limiting illustration, a value of a size parameter of a virtual object may be specified qualitatively as one or more of "small," "medium," "large," and/or descriptions. Individual qualitative values may be associated with predetermined sizes of the virtual object as it may be perceived by the user in an interactive space. In some implementations, a set of values may be specified for a set of size parameters. The set of size parameters may be associated with dimensions of a virtual object. By way of non-limiting illustration, a first size parameter may be associated with size in an x-dimension, a second size parameter may be associated with size in a y-dimension, and a third size parameter may be associated with a z-dimension. Qualitative values of a size parameter may specify numerical values with respect to units of measurement used to specify size (e.g., millimeters, centimeters, and/or other units of measurement).

Values of one or more color parameters for a virtual object may specify color of the virtual object. Color may be defined with respect to a color space and/or other color specification. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, the color space may be an RGB color space, the first color may be red, the second color may be green, and/or the third color may be blue.

Values of one or more highlight parameters for a virtual object may specify one or more visual highlights and/or audio effects of the virtual object. Visual highlights may include one or more of a glow, a pulse effect, a color effect, and/or other visual effects. A glow may include a simulation of a virtual object radiating light. A pulse effect may include a simulated pulsation of a size and/or a color of a virtual object. Values of one or more highlight parameters may include indications of individual visual highlights that may be considered active and/or inactive on a virtual object (e.g., an indication of "on" and/or "off"). A color effect may include a color change of a virtual object. Values of one or more highlight parameters for a virtual object may specify an audio effect that may be triggered through user interaction with the virtual object.

Values of one or more display mode parameters for a virtual object may specify a manner by which a virtual object may be displayed to a user. By way of non-limiting illustration, a manner by which a virtual object may be displayed may refer to one or more of a perspective by which the virtual object may be presented (e.g., plan view, isometric view, etc.), an assembled view of the virtual object, an exploded view of the virtual object, and/or other manners in which a virtual object may be displayed.

Values of one or more animation parameters for a virtual object may specify how the virtual object may be animated in the interactive space. Animation may refer to aspects of locomotion of the virtual object. The aspects of locomotion may be simple, such as rotation, and/or may be more dynamic such as simulating natural movement. By way of non-limiting illustration, a virtual object depicting a car may be animated to show the wheels spinning. By way of non-limiting illustration, a virtual object depicting animal may be animated to mimic movement to the real-world animal.

In some implementations, virtual content may include one or more of one or more virtual presentation areas, one or more virtual tools, one or more virtual object galleries, one or more virtual tool galleries, and/or other virtual content.

A virtual presentation area may be provided for presenting virtual content and/or editing virtual content presented thereon. Edits made to the virtual content while presented on the virtual presentation area may persist with the virtual content after the virtual content has been removed from the virtual presentation area. For example, a virtual object may be selected and posed on the virtual presentation area. A pose of a virtual object may include one or more of a location, an aspect ratio, a zoom, a heading, and/or other arrangement of the virtual object. Effects may be applied to the virtual object and/or effects applied to the virtual object may be changed. These operations may constitute edits to the virtual object. These edits may persist with the virtual object such that at a subsequent point in time when the virtual object is accessed, the virtual object may be configured based on the previously applied edits.

In some implementations, a virtual presentation area and/or components of a virtual presentation area may be configured to be manipulated in an interactive space. By way of non-limiting illustration, the virtual presentation area may be rotatable, translatable, expandable, contractible, and/or may be manipulated in an interactive in other ways. In some implementations, manipulation of a virtual presentation area in an interactive space may be based on user input and/or other input (see, e.g., input component 110).

A virtual presentation area may comprise a simulated body having a shape comprising one or more of square, circular, rectangular, and/or other shapes. In some implementations, the virtual presentation area may be depicted as having a perceivable thickness. The virtual presentation area may include one or more of a first surface, a second surface opposite the first surface, a boundary, and/or other components. A boundary may an include a peripheral edge of a virtual presentation area.

The first surface of the virtual presentation area may include a portion of the virtual presentation area viewable by a user of the interactive space where one or more virtual object may be posed. The second surface may be opposite the first surface.

The virtual presentation area may provide, via the first surface, a visual anchor for virtual objects. The virtual presentation area may define an anchor relationship between the virtual presentation area and individual virtual objects. The anchor relationship may define an equilibrium position for the individual virtual objects with respect to the virtual presentation area. The equilibrium position may include a return position for the individual virtual objects. The return position may include a simulated content with the first surface of the virtual presentation area. Responsive to the first virtual element being displaced from the equilibrium position, the virtual object may move towards the equilibrium position. By way of non-limiting illustration, responsive to a pose of a virtual object having a location that is distanced from the first surface of the virtual presentation area, the anchor relationship may be effectuated. Effectuating the anchor relationship may include causing the virtual object to move from the location to the return position on (or near) the first surface of the virtual presentation area. The effect of the anchor relationship may mimic a gravitational pull of the virtual object to the first surface of the virtual presentation area. There may also be a spring like effect.

In some implementations, moving a virtual object to an equilibrium position may include applying one or more forces to the virtual object. The force(s) may be directed towards the equilibrium position. In some implementations, an amount of the force applied to a virtual object toward the equilibrium position may be based on a distance between the virtual object and the equilibrium position. Such a determination of the amount of the force may allow modeling of a spring relationship between the virtual object and the first surface of the virtual presentation area. In some implementations, the application of a force to the virtual object toward the virtual presentation area may be localized such that the force does not affect the virtual presentation area. In some implementations, the user may have to break some threshold force and/or distance when moving the object away from the virtual presentation area. Otherwise, the object may spring back to the original equilibrium position.

A virtual object gallery may comprise a virtual object perceived to be present in the real-world environment. The virtual object gallery may be configured to be perceived as holding one or more virtual objects. The virtual object gallery may be configured to be manipulated in an interactive space. By way of non-limiting illustration, the virtual object gallery may be rotatable, translatable, expandable, contractible, and/or may be manipulated in an interactive space in other ways. In some implementations, manipulation of a virtual object gallery in an interactive space may be based on user input and/or other input (see, e.g., input component 110).

A virtual object gallery may be configured as a user interface and/or user interface tool within the interactive space for functional organization of virtual objects and/or representations of virtual objects utilized within the interactive space. The virtual object gallery may be configured through its shape, form, and/or other features to provide a user with a tool for which virtual objects and/or representations of virtual objects may be mounted, stacked, stored, and/or organized in other ways. In some implementations, the virtual object gallery may have a form that depicts known real-world objects used for real-world organizational purposes, such as one or more of a briefcase, a shelf, a cabinet, a dresser, a night stand, and/or other real-world objects. In some implementations, the virtual object gallery may be arranged at a right angle and/or other angles relative to the virtual presentation area.

In some implementations, a virtual object gallery may be perceived as a voluminous body. For example, the virtual object gallery may be perceived as having a visibly perceivable height, thickness, width, and/or other dimension. In some implementations, a virtual object gallery may be perceived as having little or no volume. For example, the virtual object gallery may be formed from a set of line segments such that a height and/or width may be perceivable, but the virtual object gallery may have no perceivable thickness.

In some implementations, a virtual object gallery may comprise a set of supports and/or other components. The set of supports may be perceived as "shelves" on which virtual object may be mounted, placed, and/or otherwise held. One or more virtual objects depicted as being held by a virtual object gallery may be depicted as being located on an individual support of the virtual object gallery. Individual supports may be positioned at discrete locations on the virtual object gallery. For example, the set of supports may be arranged with regular spacing on the virtual object gallery, and/or arranged in other ways. In some implementations, the set of supports may include at least one support. Individual supports may be distinctly visible on a virtual object gallery. For example, an individual support may be visually represented as a shelf where one or more virtual objects may be placed. Individual supports may have other shapes and/or forms.

A virtual object gallery may be configured to simulate removable attachment of individual virtual objects to individual supports of the virtual object gallery. When attached, the virtual object may be referred to as being in an "attached state." In some implementations, attachment of a virtual object to a support may comprise at least one surface of the virtual object simulating a contact with at least one surface of a given support. In some implementations, attachment of a virtual object to a support may comprise at least one surface of the virtual object being within a threshold distance from at least one surface of a given support. By way of non-limiting illustration, a virtual object may be "attached" to a support yet may be visually represented as "hovering" over the support by the threshold distance, and/or other distances. When a virtual object is in an attached state attached to a support of a virtual object gallery, the virtual object may move with the virtual object gallery as the virtual object gallery is manipulated within an interactive space.

In some implementations, a detachment of a virtual object from a support of a virtual object gallery may be facilitated based on the virtual object being moved away from the virtual object gallery. In some implementations, when a virtual object is detached from a support, changes in position (e.g., also referred to as "positional state") of the virtual object may be facilitated. Changing positional state of individual virtual objects may be based on user input and/or other input (see, e.g., input component 110). In some implementations, a detachment of virtual object from a support may require an amount of simulated "force" to be applied to the virtual object. Application of simulated force to individual virtual objects may be based on user input and/or other input (see, e.g., input component 110).

In some implementations, a virtual object appearing on a virtual object gallery may have a different appearance when placed on a virtual presentation area. For example, a virtual object on the virtual object gallery may have a generic shape and/or may be a reduced size version of the virtual object, and placement of the virtual object on the virtual presentation area may cause the virtual object to appear according to a specified appearance or form of the virtual object. The generic shape may be spherical and/or other shapes. Once placed on a virtual presentation area, the virtual object may take an intended appearance or form of the virtual object. By way of non-limiting illustration, a virtual object may depict a car and/or other shapes. A virtual object having a spherical shape may be included on a virtual object gallery and may represent the car virtual object. When placed and posed on the virtual presentation area, the virtual object may change its appears to depict the car.

In some implementations, an individual virtual tool may represent an individual effect applied to a virtual object and/or an individual effect available to be applied to individual virtual objects present on the virtual presentation area. In some implementations, one or more virtual tools may be positioned at or near the boundary of a virtual presentation area.

In some implementations, application of one or more effects on a virtual object may specify one or more values of one or more parameters of the virtual object. In some implementations, application of one or more effects on a virtual object may alter the virtual object and/or add content to the virtual object. By way of non-limiting illustration, effects may include one or more of a color effect, an annotation effect, a display mode effect, a highlight effect, an animation effect, and/or other effects. An application of a color effect may specify one or more values of one or more color parameters of a virtual object. An application of an annotation effect may add an annotation window to a virtual object. An application of a display mode effect may specify one or more values of one or more display mode parameters of a virtual object. An application of a highlight effect may specify one or more values of one or more highlight parameters of a virtual object. In some implementations, an application of an effect and/or a specific modification of a virtual object based on an applied effect may be based on user input and/or other input (see, e.g., input component 110).

Its noted that the above descriptions of a color effect, an annotation effect, an animation effect, and/or a display mode effect are provided for illustrative purposes only and are not to intended to be limiting. Instead, those skilled in the art will appreciate other effects may be applied to a virtual object within the context of this disclosure.

A virtual tool gallery may comprise a virtual object perceived to be present in the real-world environment. The virtual tool gallery may be configured to be perceived as holding one or more virtual tools. The virtual tool gallery may be configured to be manipulated in an interactive space. By way of non-limiting illustration, the virtual tool gallery may be rotatable, translatable, expandable, contractible, and/or may be manipulated in an interactive space in other ways. In some implementations, manipulation of a virtual tool gallery in an interactive space may be based on user input and/or other input (see, e.g., input component 110).

A virtual tool gallery may be configured as a user interface and/or user interface tool within the interactive space for functional organization of virtual tools and/or representations of virtual tools utilized within the interactive space.

In some implementations, a virtual tool gallery may be perceived as a voluminous body. For example, the virtual tool gallery may be perceived as having a visibly perceivable height, thickness, width, and/or other dimension. In some implementations, a virtual tool gallery may be perceived as having little or no volume. For example, the virtual tool gallery may be formed from a set of line segments such that a height and/or width may be perceivable, but the virtual tool gallery may have no perceivable thickness.

In some implementations, a virtual tool gallery may comprise a set of sockets and/or other components. The set of sockets may be perceived as locations on which virtual tools may be mounted, placed, and/or otherwise held. One or more virtual tools depicted as being held by a virtual tool gallery may be depicted as being located on an individual socket of the virtual tool gallery. Individual sockets may be positioned at discrete locations on the virtual tool gallery. For example, the set of sockets may be arranged with regular spacing on the virtual tool gallery, and/or arranged in other ways. In some implementations, the set of sockets may include at least one socket. Individual sockets may be distinctly visible on a virtual tool gallery.

A virtual tool gallery may be configured to simulate removable attachment of individual virtual tools to individual supports of the virtual tool gallery. When attached, the virtual tool may be referred to as being in an "attached state." In some implementations, attachment of a virtual tool to a socket may comprise at least one surface of the virtual tool simulating a contact with at least one surface of a given socket. In some implementations, attachment of a virtual tool to a socket may comprise at least one surface of the virtual tool being within a threshold distance from at least one surface of a given socket. By way of non-limiting illustration, a virtual tool may be "attached" to a socket yet may be visually represented as "hovering" over the socket by the threshold distance, and/or other distances. When a virtual tool is in an attached state attached to a socket of a virtual tool gallery, the virtual tool may move with the virtual tool gallery as the virtual tool gallery is manipulated within an interactive space.

In some implementations, a detachment of a virtual tool from a socket of a virtual tool gallery may be facilitated based on the virtual tool being moved away from the virtual tool gallery. In some implementations, when a virtual tool is detached from a socket, changes in position (e.g., also referred to as "positional state") of the virtual tool may be facilitated. Changing positional state of individual virtual tools may be based on user input and/or other input (see, e.g., input component 110). In some implementations, a detachment of virtual tool from a socket may require an amount of simulated "force" to be applied to the virtual object. Application of simulated force to individual virtual objects may be based on user input and/or other input (see, e.g., input component 110).

Figure 3:
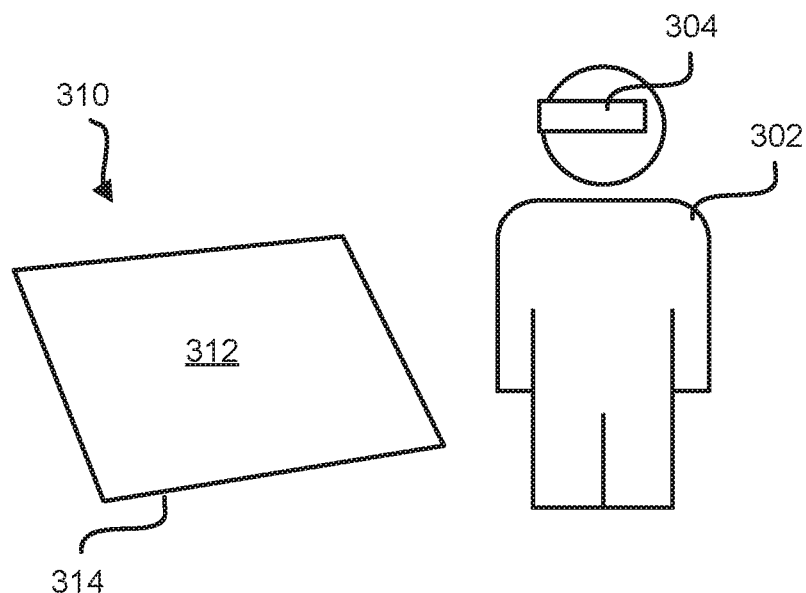
FIG. 3 illustrates a user and a view of an interactive space.

FIG. 3 illustrates a user 302 and a view of an interactive space, in accordance with one or more implementations of system 100 (FIG. 1) presented herein. The user 302 may be wearing a headset 304 and/or other components. The headset 304 may include one or more components of system 100 (FIG. 1) to facilitate presenting virtual content in the interactive space. The virtual content may include a virtual presentation area 310, and/or other virtual content. The virtual presentation area 310 may include one or more of a first surface 312, a second surface opposite first surface (not shown), a boundary 314, and/or other content.

Figure 4:
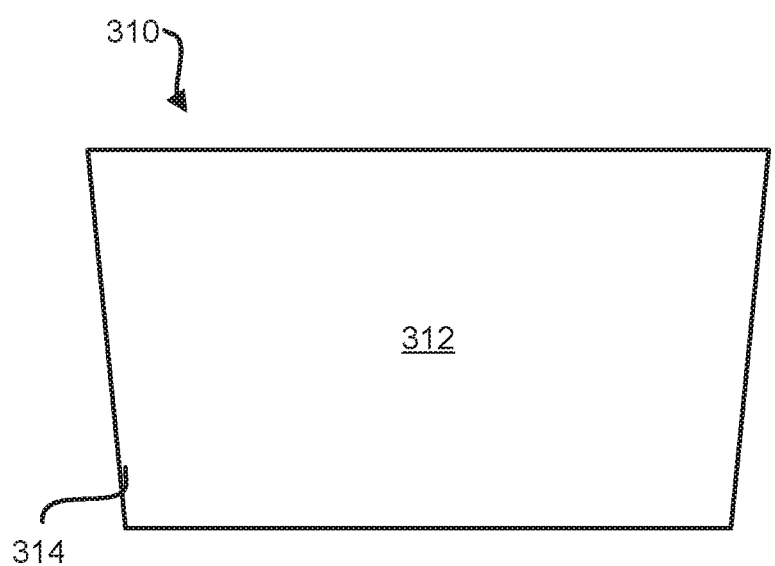
FIG. 4 illustrates a view of virtual content within the interactive space of FIG. 3 as perceived by the user of the interactive space.

FIG. 4 illustrates a view of virtual content within the interactive space of FIG. 3 as perceived by user 302 of the interactive space. For example, virtual presentation area 310 may be perceived as a flat table-like surface in front of the user.

Figure 5:
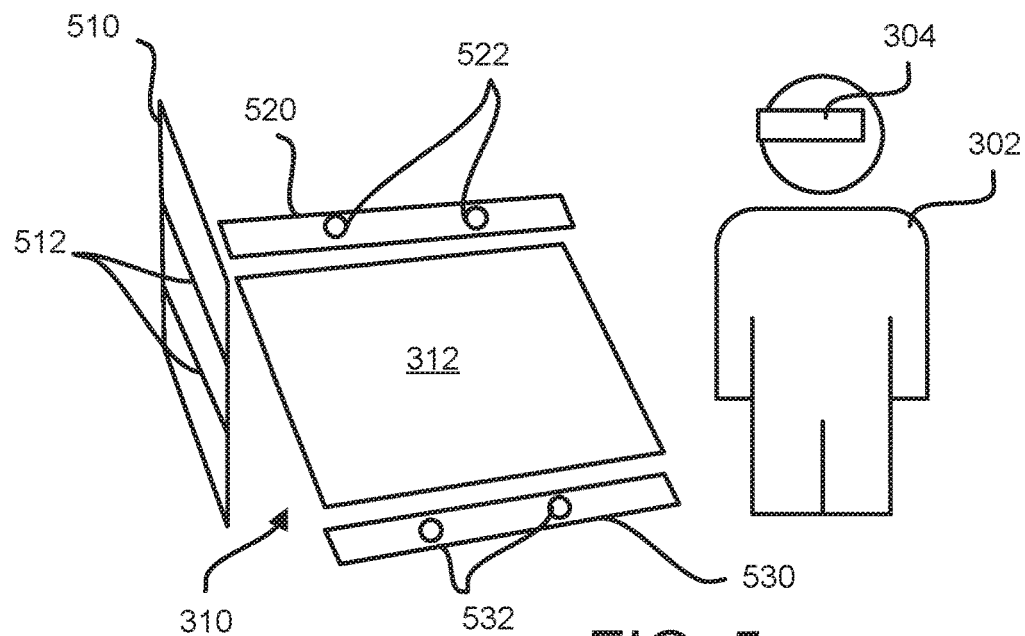
FIG. 5 illustrates a user and a view of an interactive space.

FIG. 5 illustrates user 302 and another view of the interactive space, in accordance with one or more implementations of system 100 (FIG. 1) presented herein. The virtual content may include one or more of virtual presentation area 310, a virtual object gallery 510, a first virtual tool gallery 520, a second virtual tool gallery 530, and/or other virtual content. The virtual object gallery 510 may include a set of supports 512. The first virtual tool gallery 520 may include a first set of sockets 522. The second virtual tool gallery 530 may include a second set of sockets 532.

Figure 6:
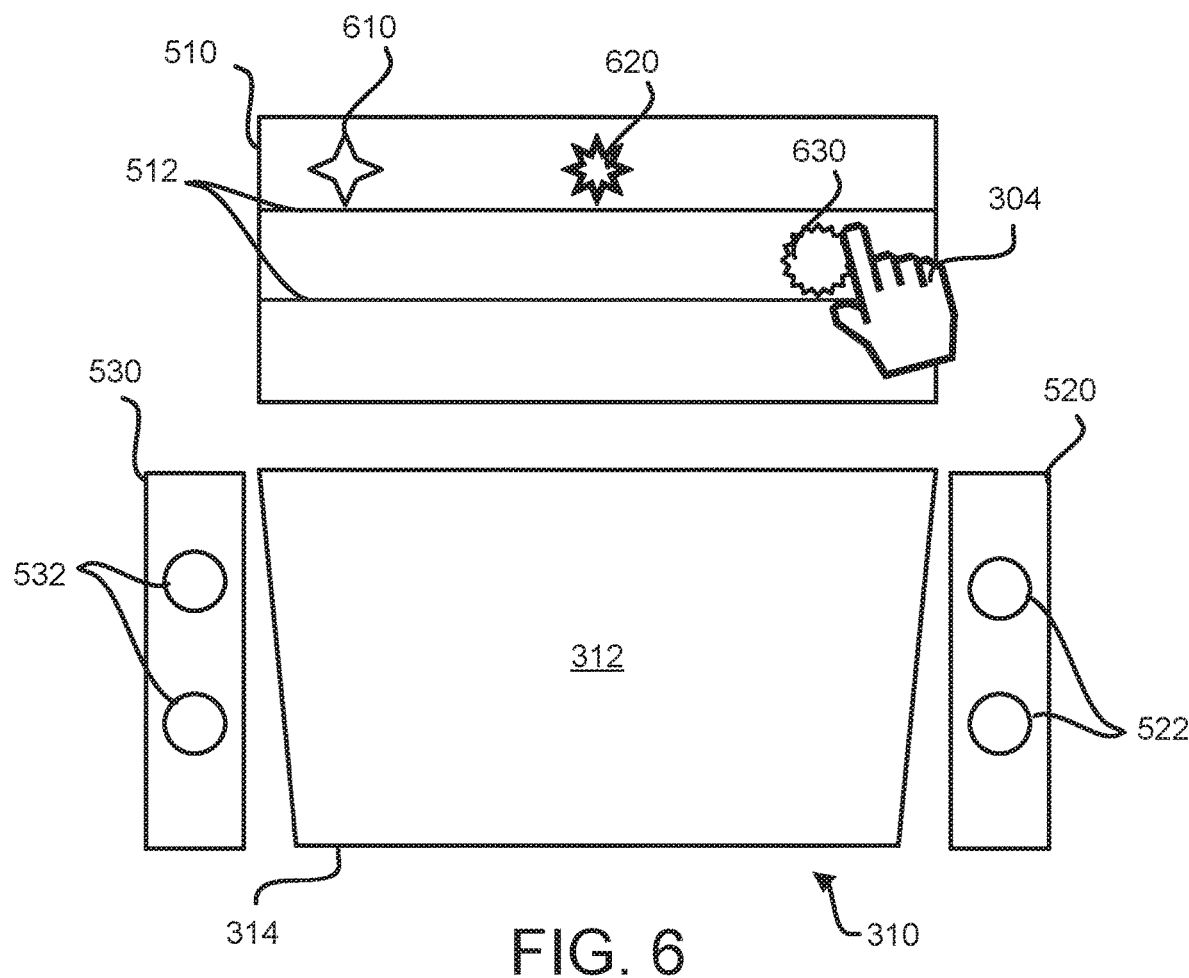
FIG. 6 illustrates a view of virtual content within the interactive space of FIG. 5 as perceived by the user of the interactive space.

FIG. 6 illustrates a view of virtual content within the interactive space of FIG. 5 as perceived by user 302 of the interactive space. For example, virtual presentation area 310 may be perceived as a flat table-like surface in front of the user; virtual object gallery 510 may be at a far edge of virtual presentation area 310 and arranged at a right angle to virtual presentation area 310; first virtual tool gallery 520 may be arranged on a first side of virtual presentation area 310; and second virtual tool gallery 530 may be arranged on a second side of virtual presentation area 310 opposite the first side. In some implementations, the first virtual gallery 520 and/or second virtual tool gallery 530 may be arranged to appear on the same horizontal plane as virtual presentation area 310.

Returning to FIG. 1, one or more physical processors 104 may be configured by machine-readable instructions 106. Executing machine-readable instructions 106 may cause one or more physical processors 104 to facilitate providing views of virtual content in an interactive space. The machine-readable instructions 106 may include one or more of a control component 108, an input component 110, an anchor component 111, an application component 112, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include control of the generation and/or emission of light to form images of virtual content, and/or other types of control.

By way of non-limiting illustration, control component 108 may be configured to control one or more light sources 122 to generate light forming images of one or more of an instance of a virtual presentation area, an instance of a virtual object gallery, an instance of a virtual tool gallery, an instance of a virtual object depicted as being held by a virtual object gallery, an instance of a virtual tool depicted as being held by virtual tool gallery, and/or other images of other virtual content.

Returning to FIG. 6, virtual object gallery 510 may be depicted as holding one or more virtual objects. The one or more virtual objects may include one or more of a first virtual object 610, a second virtual object 620, a third virtual object 630, and/or other virtual objects.

Returning to FIG. 1, in some implementations, input component 110 may be configured to obtain user input for manipulating virtual content in an interactive space. Obtaining user input may include obtaining information representing a user's actions and/or interactions with system 100. This may include one or more of receiving such information, accessing such information, determining such information, and/or obtaining such information in other ways. The user input may comprise gesture-based input and/or other input. In some implementations, user input may be derived from one or more of sensor output of one or more sensors 120, sensor output from one or more other sensors, and/or other sources. The input component 110 may be configured to detect and/or recognize one or more real-world objects based on sensor output from one or more sensors 120. A real-world object may include, for example, a human hand and/or other user appendage. One or more real-world objects may be recognized based on one or more point clouds having points lying on one or more surface of the one or more real-world objects. By way of non-limiting illustration, a point cloud having a shape of a known real-world object (e.g., a human hand) may be recognized as the real-world object. Recognition of a real-world object may include identification of the presence of the real-world object.

In some implementations, input component 110 may be configured to identify gestures and/or actions being performed by one or more real-world objects. A gesture and/or action may include one or more of reaching, grabbing, releasing, swiping, pinching, pulling, throwing, clicking, pointing, pushing, and/or other gestures and/or actions of real-world objects. By way of non-limiting illustration, input component 110 may utilize one or more gesture recognition techniques to identify one or more gestures and/or actions being performed by one or more real-world objects. The input component 110 may be configured to provide one or more identified gestures and/or actions as user input for manipulating virtual content in an interactive space.

The input component 110 may be configured to obtain user input comprising gesture-based inputs for manipulating one or more virtual objects. Manipulating a virtual object may include a series of gesture-based inputs. The gesture-based inputs may include one or more of a gesture of grabbing the virtual object, a gesture of holding the virtual object, changing position of the virtual object while the virtual object is in a held state, a gesture of releasing the virtual object from a held state, and/or other input. In some implementations, the series of gestures described above may be referred to as a "drag-and-drop" gesture.

In some implementations, the manipulation may include one or more of removing one or more virtual objects from a virtual object gallery, posing one or more virtual objects on surface of a virtual presentation area, grabbing one or more virtual tools, simulating a contact of a virtual tool with a virtual object on a virtual presentation area, and/or other manipulation.

In some implementations, posing virtual objects may include a set of gesture-based inputs. The set of gesture-based inputs may include one or more of a gesture of grabbing the virtual object, a gesture of moving the virtual object to a central portion of a virtual presentation area, a gesture of rotating the virtual object (and/or other orientation changes), a gesture of releasing the virtual object, and/or other input.

In some implementations, specifying one or more effects to apply to virtual objects may include a set of gesture-based inputs. The set of gesture-based inputs may include a drag-and-drop gesture. By way of non-limiting illustration, the set of gestures may include one or more of a gesture of grabbing a virtual tool, a gesture of moving the virtual tool at or near a position of a virtual object, a gesture of releasing the virtual tool at or near the position of the virtual object, and/or other input. In some implementations, "at or near" may refer to one or more of a simulated contact of the virtual tool with the virtual object, the virtual tool coming within a threshold distance from the virtual object, and/or other considerations. In some implementations, a set of gestures may facilitate effectuating a change in position of a virtual tool from a starting virtual position to an ending virtual position at or near a virtual position of the virtual object on the virtual presentation area.

In some implementations, input component 110 may be configured to track a user appendance as the user performs gestures or otherwise interacts with content in an interactive space. By way of non-limiting illustration, a hand may be tracked by determining positions of one or more features of the hand using position information and/or other information. Positions of one or more features of a hand may be determined through one or more iterations including operations of determining estimated positions of individual features from estimated positions of other ones of the features. Such an iterative procedure may be performed as position information may be obtained. The position information may be obtained based on a sampling rate of a given sensor.

In some implementations, an estimated position of a first feature of a hand may be determined from position information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may comprise one centimeter, and/or other distances.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given a position of a first feature of a hand, a position of a second feature may be determined based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

Returning to FIG. 6, a hand 304 of a user may be detected and tracked. The user may perform one or more gestures with hand 304 to manipulate virtual content. By way of non-limiting illustration, the user may perform a set of gestures with hand 304 for selecting third virtual object 630. The set of gestures may include a grab gesture and/or other gestures.

Figure 7:
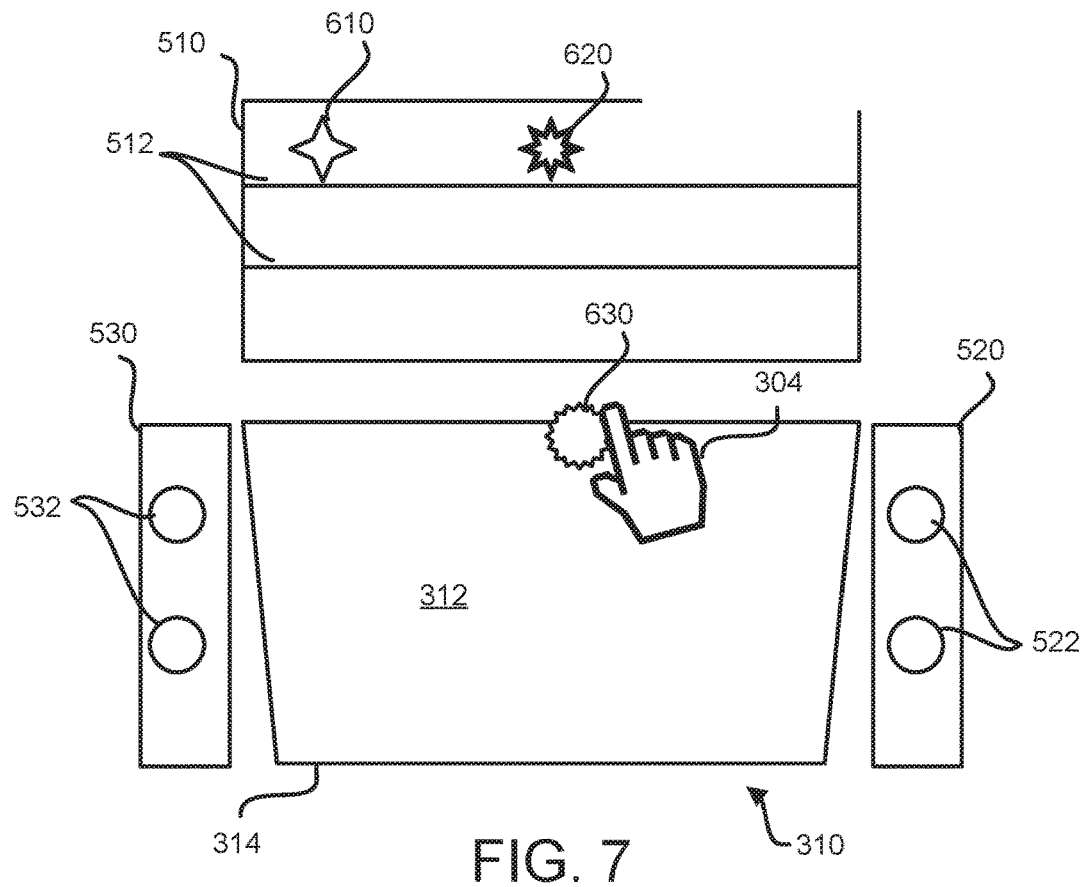
FIG. 7 illustrates a view of virtual content within the interactive space of FIG. 5 as perceived by the user of the interactive space.

FIG. 7 illustrates a set of gestures performed by hand 304 to pose third virtual object 630 at or near first surface 312 of virtual presentation area 310. The set of gestures may include one or more of grabbing, moving, rotating, releasing, throwing, dropping, and/or other gestures.

In some implementations, anchor component 111 may be configured to effectuate an anchor relationship responsive to a pose of a virtual object having a location that is distanced from a first surface of a virtual presentation area (e.g., the equilibrium position). Effectuating the anchor relationship may comprise causing the virtual object to move from the location to the return position on the surface of the virtual presentation area.

Figure 8:
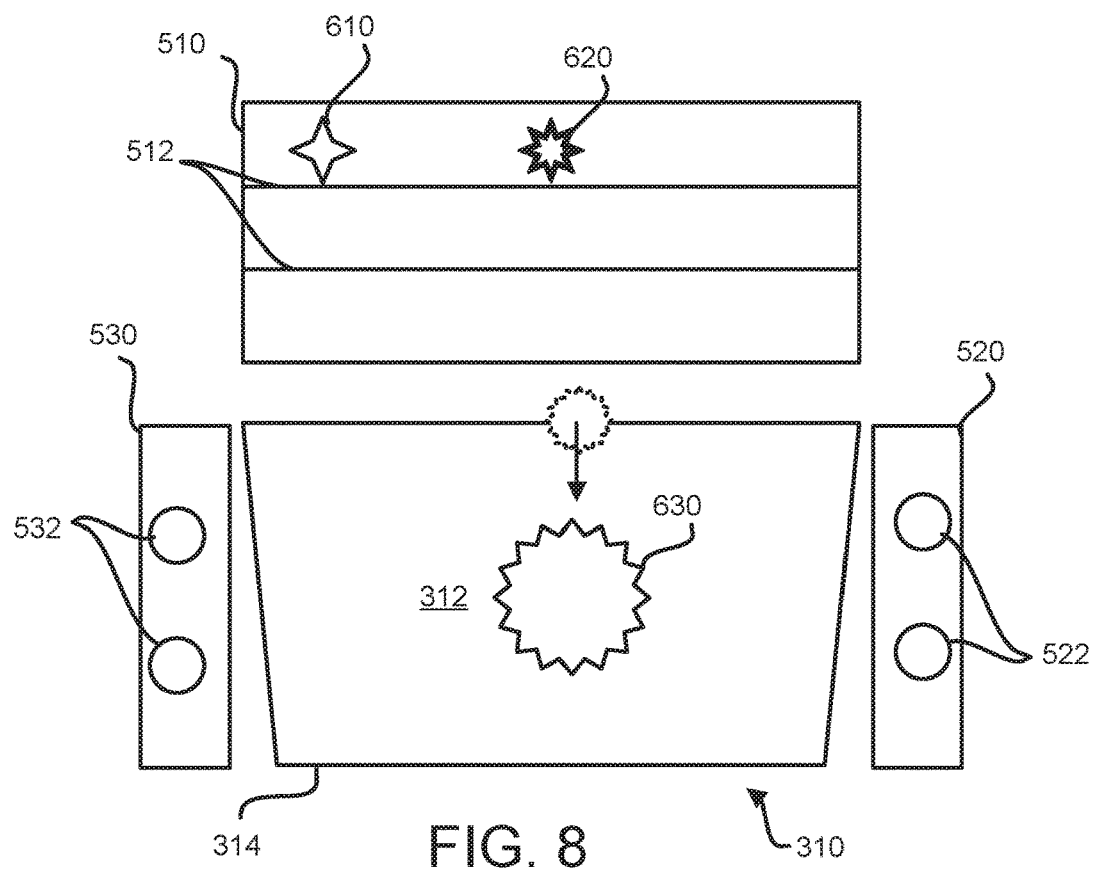
FIG. 8 illustrates a view of virtual content within the interactive space of FIG. 5 as perceived by the user of the interactive space.

As illustrated in FIG. 8, the pose of third virtual object 630 achieved from the set of gestures described with respect to FIG. 7 may cause third virtual object 630 to be at location that may be distanced from first surface 312 of virtual presentation area 310. Responsive to this placement, an anchor relationship may cause third virtual object 630 to move from the location to a return position including a simulated contact with first surface 312.

Returning to FIG. 1, in some implementations, control component 110 may be configured to, responsive to a virtual object moving from a location distanced from a virtual presentation area to the return position on the surface of the virtual presentation area, generate one or more of an image conveying the metadata information for the virtual object, a virtual tool gallery, one or more virtual tools, and/or other content while the virtual object is in the return position on the surface of the virtual presentation area. The image conveying the metadata information for the virtual object may include text and/or other content. The one or more virtual tools may include tools representing effects applied to the virtual object and/or effects available to be applied to the virtual object. The one or more virtual tools may appear as populating sockets of the virtual tool gallery.

Figure 9:
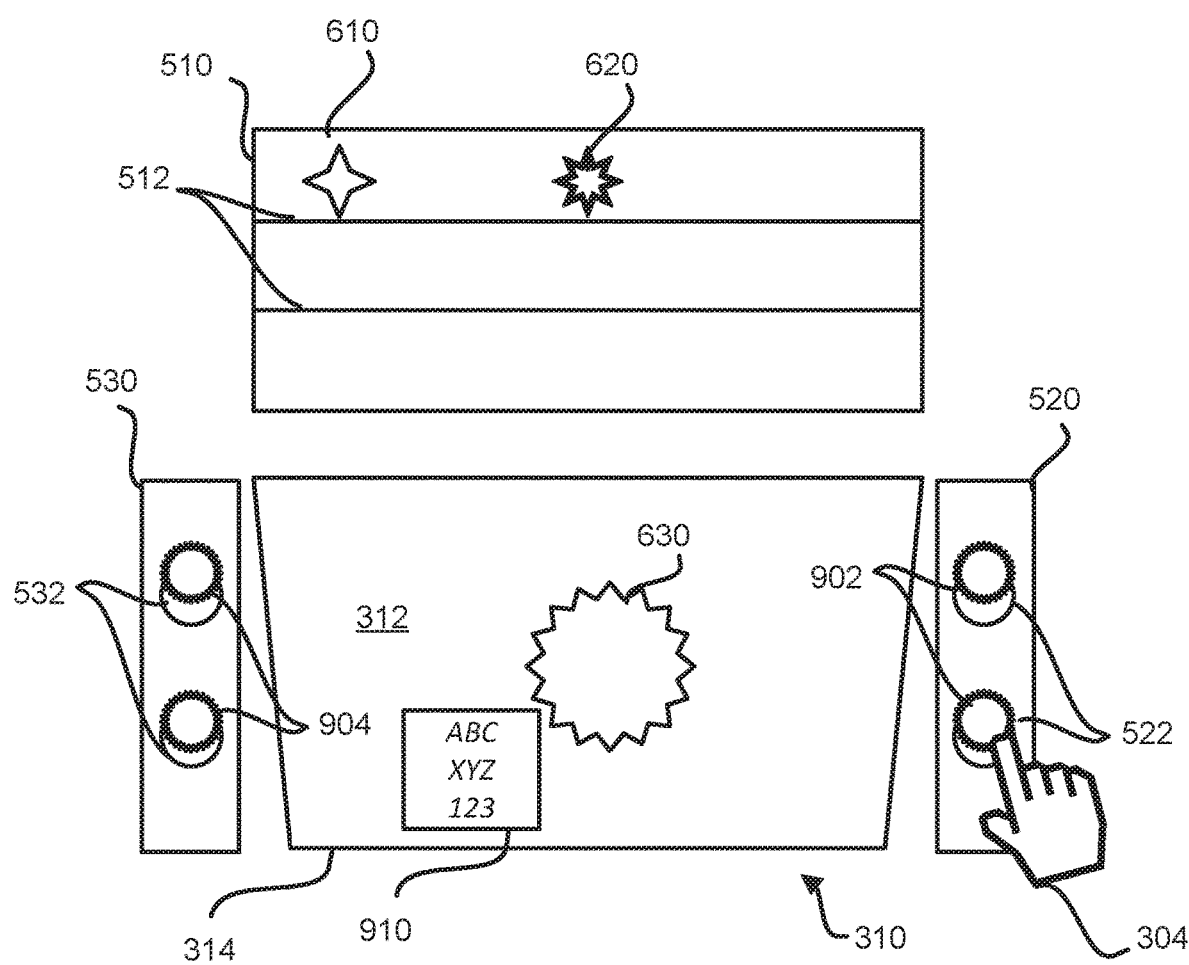
FIG. 9 illustrates a view of virtual content within the interactive space of FIG. 5 as perceived by the user of the interactive space.

Referring now to FIG. 9, responsive to the third virtual object 630 moving from the location to the return position on the first surface 312 of virtual presentation area 310, one or more virtual tools may be generated and depicted as populating the sockets of the virtual tool galleries. The one or more virtual tools populating the virtual tool galleries may include virtual tools representing the effects applied to third virtual object 630 and/or the effects available to be applied to third virtual object 630. The one or more virtual tools may include a first set of tools 902 on first virtual tool gallery 530, a second set of tools 904 on second virtual tool gallery 530, and/or other virtual tools.

In some implementations, responsive to the third virtual object 630 moving from the location to the return position on the first surface 312 of virtual presentation area 310, metadata information 910 for the third virtual object 630 may be presented. The metadata information 910 may include text and/or other content. The metadata information 910 may be presented on first surface 312 adjacent to third virtual object 630.

Returning to FIG. 1, in some implementations, application component 112 may be configured to, responsive to obtaining user input specifying one or more effects to apply to virtual objects, specify within the effects information defining the virtual objects one or more values of one or more parameters of the virtual objects to reflect the application of effects. User input to specify effects may include one or more of user input to select a virtual tool, user input to specify a value of a parameter, and/or other input. The user input to select a virtual tool may comprise a first set of gestures. The user input to specify a value of a parameter may comprise a second set of gestures. The first set of gestures may include one or more of grabbing the virtual tool, moving the virtual tool in proximity of a virtual object, and/or other gestures. The second set of gestures may include one or more of releasing the virtual tool at or near the virtual object, touching the virtual tool to the virtual object, and/or other gestures. In some implementations, the first set of gestures and second set of gestures may cumulatively be a drag-and-drop gesture.

The specification of a value of a parameter for an effect applied to a virtual object may cause the effects information for the virtual object to specify the value of the parameter for the effect as being applied to the virtual object. Accordingly, the applied effect may persist with the virtual object after the user is finished with the object on the virtual presentation area.

Returning to FIG. 9, hand 304 may perform a set of gestures to select a virtual tool associated with an effect. The hand 304 may perform a set of gestures to specify a value for a parameter associated with the effect for third virtual object 630. The specification of the value of the parameter for the effect applied to third virtual object 630 may cause effects information for third virtual object 630 to specify the value of the parameter as being applied to third virtual object 630.

Returning to FIG. 1, processor(s) 104, one or more sensors 120, one or more light sources 122, one or more optical elements 124, external resources 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more sensors 120, one or more light sources 122, one or more optical elements 124, external resources 126, and/or other components of system 100 may be operatively linked via some other communication media. For example, operative linking of components of system 100 may be carried out regardless of whether multiple users may be viewing/presenting a virtual presentation area in real-time in-person, remotely synced, and/or asynchronously.

In some implementations, system 100 may support asynchronous or "offline" collaboration. For example, a set of components (e.g., an HMD and/or other components) utilized by one user may authenticate to system 100, download and render a virtual presentation area, and/or manipulate virtual objects in the virtual presentation area. The user may then share, via an invitation, access to the virtual presentation area, object, and/or other content to one or more other users utilizing one or more other components (e.g., an HMD and/or other components). A user accessing the virtual object and/or virtual presentation area may initiate a real-time viewing and/or editing of the virtual objects once the saved presentation is activated and rendered for viewing by the user.

The external resources 126 may include sources of information, hosts, external entities participating with system 100, providers of virtual content, and/or other resources. In some implementations, some or all of the functionality attributed herein to external resources 126 may be provided by resources included in system 100.

The processor(s) 104 may include and/or have access to electronic storage 114, and/or other components. The processor(s) 104 may include communication lines or ports to enable the exchange of information with a network, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 111, and/or 112. Processor(s) 104 may be configured to execute components 108, 110, 111, and/or 112 by software; hardware; firmware; some combination of software, hardware, and/or firmware; and/or other mechanisms for configuring processing capabilities on processor(s) 104.

It should be appreciated that although components 108, 110, 111, and/or 112 are illustrated in FIG. 1 as being co-located within a single processing unit, in implementations in which processor(s) 104 includes multiple processing units, one or more of components 108, 110, 111, and/or 112 may be located remotely from the other components. The description of the functionality provided by the different components 108, 110, 111, and/or 112 described above is for illustrative purposes and is not intended to be limiting, as any of components 108, 110, 111, and/or 112 may provide more or less functionality than is described. For example, one or more of components 108, 110, 111, and/or 112 may be eliminated, and some or all of its functionality may be provided by other ones of components 108, 110, 111, 112, and/or other components. As another example, processor(s) 104 may be configured to execute one or more additional components that may perform some or all of the functionality attributed to one of components 108, 110, 111, and/or 112.

Figure 2:
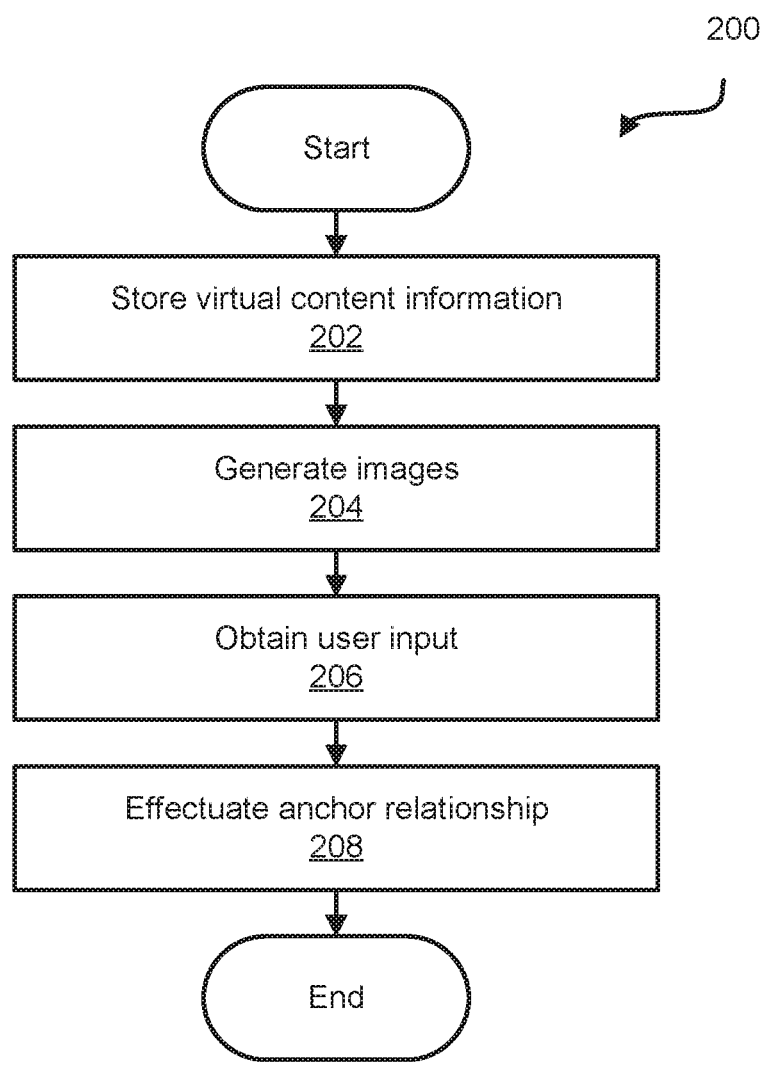
FIG. 2 illustrates a method to present virtual content in an interactive space, in accordance with one or more implementations.

FIG. 2 illustrates a method 200 to present virtual content in an interactive space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more sensors, one or more optical elements, and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to present virtual content in an interactive space, the system comprising:
    non-transitory electronic storage storing virtual content information, the virtual content information defining virtual content, the virtual content including:
        virtual objects, individual virtual objects being defined by visual information and effects information, the visual information specifying visual characteristics of individual virtual objects, the effects information specifying effects applied to the individual virtual objects and effects available to be applied to the individual virtual objects; and
        a virtual presentation area for presenting the virtual objects, the virtual presentation area providing a visual anchor for the virtual objects, wherein the virtual presentation area defines an anchor relationship between the virtual presentation area and the individual virtual objects when placed on the virtual presentation area by a user, the anchor relationship defining an equilibrium position for the individual virtual objects with respect to the virtual presentation area, the equilibrium position including a return position for the individual virtual objects on a simulated surface of the virtual presentation area;
    one or more physical processors configured by machine-readable instructions to:

generate images of the virtual content to be perceived as being present within a real-world environment, the images including:
a first image of an instance of the virtual presentation area; and
a second image of an instance of a first virtual object; and
obtain user input for selecting one or more virtual objects to be presented on the instance of the virtual presentation area, the user input comprising:
selection of the first virtual object; and
a pose for the first virtual object, the pose including a location of the first virtual object with respect to the virtual presentation area; and
responsive to the pose of the first virtual object having the location that is distanced from the simulated surface of the virtual presentation area, effectuate the anchor relationship, wherein effectuating the anchor relationship comprises:
causing the first virtual object to move from the location to the return position on the simulated surface of the virtual presentation area,
wherein the individual virtual objects are further defined by metadata information, the metadata information including identification information, relationship information, and the effects information; and wherein the one or more physical processors are further configured by the machine-readable instructions to:
responsive to the first virtual object moving from the location to the return position on the simulated surface of the virtual presentation area, generate an image conveying the metadata information for the first virtual object while the first virtual object is in the return position on the simulated surface of the virtual presentation area.

2. The system of claim 1, wherein the virtual content defined by the virtual content information further includes virtual tools positioned to be viewable with the virtual presentation area, individual virtual tools representing different effects applicable to the individual virtual objects; and
wherein the one or more physical processors are further configured by the machine-readable instructions to:
obtain user input for selecting one or more affects to be applied to individual virtual objects presented on the virtual presentation area, the user input comprising:
selection of a first virtual tool for application to the first virtual object, the first virtual tool representing a first effect; and
specification of a value of a first parameter for the first effect that is applied to the first virtual object by the first virtual tool, wherein specification of the value of the first parameter for the first effect applied to the first virtual object causes the effects information for the first virtual object to specify the value of the first parameter for the first effect as being applied to the first virtual object.

3. The system of claim 2, wherein:
the first virtual tool is perceived at a first virtual position at or near a boundary of the instance of the virtual presentation area.

4. The system of claim 1, wherein the image conveying the metadata information for the first virtual object includes text.

5. The system of claim 1, wherein the image conveying the metadata information is presented on the simulated surface of the virtual presentation area.

6. The system of claim 1, wherein the user input comprises gesture-based input, such that:
selecting the first virtual object is facilitated by a first set of gestures; and
posing the first virtual object is facilitated by a second set of gestures.

7. The system of claim 2, wherein the first effect includes one or more of a color effect, an animation effect, an annotation effect, a display mode effect, or an audio effect.

8. The system of claim 1, further comprising:
a light source configured to emit light forming the images of the virtual content; and
an optical element, the optical element being configured to provide the light emitted from the light source to an eye of the user to generate the interactive space.

9. The system of claim 1, wherein the virtual content further includes:
a virtual object gallery, the virtual object gallery comprising a set of supports, individual supports being positioned at discrete locations on the virtual object gallery, wherein at least one surface of a second virtual simulates contact with at least one surface of one of the set of supports.

10. The system of claim 3, wherein the virtual content further includes:
a virtual tool gallery positioned at the boundary of the virtual presentation area, the virtual tool gallery comprising a set of sockets, individual sockets being positioned at discrete locations on the virtual tool gallery, wherein at least one surface of another one of the virtual tools simulates contact with at least one surface of one of the set of sockets.

11. The system of claim 10, wherein the one or more physical processors are further configured by the machine-readable instructions to:
responsive to the first virtual object to moving from the location to the return position on the simulated surface of the virtual presentation area:
generate an image of an instance of the virtual tool gallery while the first virtual object is in the return position on the simulated surface of the virtual presentation area; and
generate an image of an instance of other ones of the virtual tools populating the virtual tool gallery, wherein the other ones of the virtual tools populating the virtual tool gallery represent one or more of the effects applied to the first virtual object and the effects available to be applied to the first virtual object.

* * * * *